W. T. REASER.

BALANCE SLIDE VALVE.

No. 10,449. Reissued Feb. 12, 1884.

Witnesses:
E. G. Jones
C. H. Brown.

Inventor:
Harrison T. Reaser
by Strutt & Underwood
Attorneys.

N. PETERS, Photo-Lithographer, Washington, D. C.

UNITED STATES PATENT OFFICE.

WARREN T. REASER, OF ROCKFORD, ILLINOIS.

BALANCE SLIDE-VALVE.

SPECIFICATION forming part of Reissued Letters Patent No. 10,449, dated February 12, 1884.

Original No. 273,891, dated March 13, 1883. Application for reissue filed January 15, 1884.

*To all whom it may concern:*

Be it known that I, WARREN T. REASER, a citizen of the United States, residing at Rockford, in the county of Winnebago and State of Illinois, have invented certain new and useful Improvements in Balanced Slide-Valves; and I do hereby declare the following to be a full, clear, and exact description of the same, such as will enable others skilled in the art to which it appertains to make and use it.

This invention relates to certain new and useful improvements in means especially designed for lessening or preventing the friction between a slide-valve and its seat, and will be fully described hereinafter.

Figure 1:
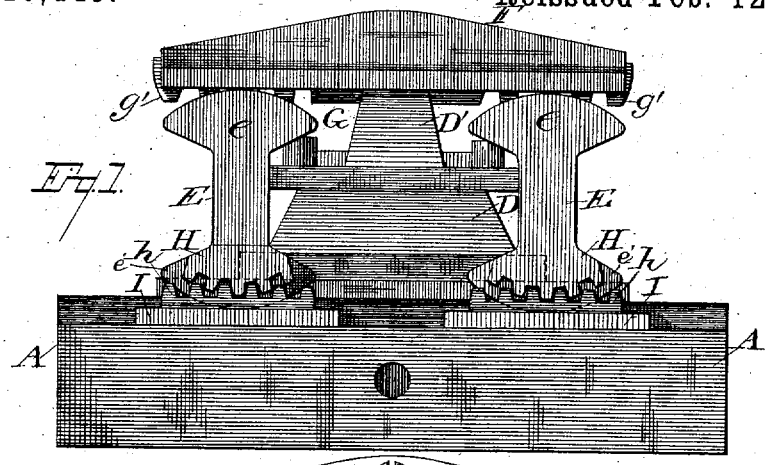
Figure 2:
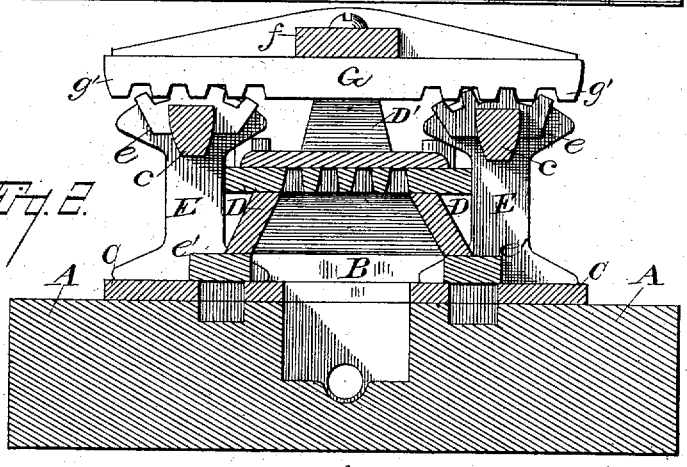
Figure 3:
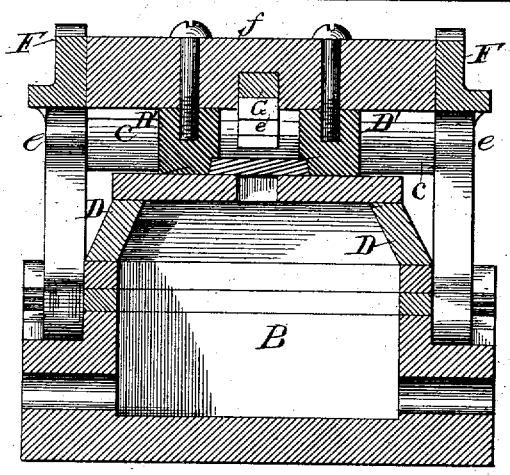

In the drawings, Figure 1 is a side view of a balanced slide-valve embodying my invention. Fig. 2 is a longitudinal vertical central section of the same. Fig. 3 is a central cross-section.

In each of these figures, A represents the upper portion of the steam-cylinder; B, the steam-chest; C, the valve-seat, and D the slide-valve.

E E are supports for the valve D, and *c c* are cross bars or rods, each of which serves to rigidly connect a pair of the supports E E, so that the supports composing each pair will always act in unison. Midway between each pair of supports E E the cross bars or rods *c c* are each provided with a toothed segment, *g*, to receive and mesh with corresponding teeth or projections, *g'*, that depend from a bar, G, which latter is secured at about its center to the under side of a cross-bar, *f*. The ends of the supports E E are curved, as shown in Figs. 1 and 2 of the drawings, to form rocking bearings *e* and *e'*. The bearings *e'* rest upon the upper side of the cylinder or upon horizontal plates I I, secured to the same, while the bearings *e* receive and carry plates F, that are rigidly connected by the cross-bar G, and this plate or bar G is connected by pillars or supports D' with the top of the valve D, so that the entire weight of the valve is upon the plates F and supports E E, and when the valve is reciprocated by an ordinary valve-rod there will be no frictional contact between the valve and its seat.

To prevent the rockers from slipping, I provide each lower rocker with a segment, H, having downwardly-depending teeth that mesh with the teeth of a rack, *h*, attached to the cylinder or horizontal plates I.

The above-described device is also applicable to what are known as "double valves."

I am aware that it is not new to provide balanced slide-valves with vibrating or rocking supports, and therefore I disclaim such, broadly.

I am also aware that valves have been supported by rollers placed beneath the cap of the valve and at right angles to the line of its travel; but this construction is clumsy and takes up a great deal of room. In my device the supports are very light, and as there is sufficient space between the supports forming each pair to permit the valve to reciprocate between them, they take up very little room.

Having thus fully described my invention, what I claim as new, and desire to secure by Letters Patent, is—

1. In a balanced slide-valve, the combination of supports having bearing-surfaces curved from a common center, cross-arms rigidly connecting the supports in pairs, and a bar connecting the cross-arms with each other and with the valve, substantially as described.

2. In a balanced slide-valve, the combination of supports having bearing-surfaces at top and bottom, curved from a common center, cross-arms rigidly connecting the supports in pairs, and having toothed segments *g g*, with a bar supporting the valve, and having teeth that engage with those of the segments *g g*, substantially as described.

3. The combination, with a slide-valve and its seat, of vibrating supports having segmental or rocking bearings at their upper and lower ends, toothed segments connected thereto, toothed segments *g g*, toothed bars *h h*, cross-bars *c c*, and rod or bar G, substantially as set forth.

WARREN T. REASER.

In presence of—
STANLEY S. STOUT,
R. J. MCCONNELL.